United States Patent
Chen et al.

(10) Patent No.: US 11,875,799 B2
(45) Date of Patent: Jan. 16, 2024

(54) METHOD AND DEVICE FOR FUSING VOICEPRINT FEATURES, VOICE RECOGNITION METHOD AND SYSTEM, AND STORAGE MEDIUM

(71) Applicant: SOUNDAI TECHNOLOGY CO., LTD., Beijing (CN)

(72) Inventors: Xiaoliang Chen, Beijing (CN); Dahang Feng, Beijing (CN); Shaowei Su, Beijing (CN); Le Chang, Beijing (CN)

(73) Assignee: SOUNDAI TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 17/427,464

(22) PCT Filed: Jul. 23, 2019

(86) PCT No.: PCT/CN2019/097294
§ 371 (c)(1),
(2) Date: Jul. 30, 2021

(87) PCT Pub. No.: WO2020/155584
PCT Pub. Date: Aug. 6, 2020

(65) Prior Publication Data
US 2022/0139401 A1 May 5, 2022

(30) Foreign Application Priority Data
Jan. 31, 2019 (CN) .......................... 201910101748.3

(51) Int. Cl.
G10L 17/06 (2013.01)
G06F 17/16 (2006.01)
(Continued)

(52) U.S. Cl.
CPC .............. *G10L 17/06* (2013.01); *G06F 17/16* (2013.01); *G06N 3/04* (2013.01); *G10L 17/02* (2013.01);
(Continued)

(58) Field of Classification Search
None
See application file for complete search history.

(56) References Cited

U.S. PATENT DOCUMENTS

2017/0124311 A1* 5/2017 Li ........................... G10L 15/26
2018/0144742 A1* 5/2018 Ye ........................... G10L 15/02
(Continued)

FOREIGN PATENT DOCUMENTS

CN 104899604 A 9/2015
CN 109801634 A 5/2019

OTHER PUBLICATIONS

Variani, Ehsan, et al. "Deep neural networks for small footprint text-dependent speaker verification." 2014 IEEE international conference on acoustics, speech and signal processing (ICASSP). IEEE, 2014. (Year: 2014).*

Yang, Yexin, et al. "Generative adversarial networks based x-vector augmentation for robust probabilistic linear discriminant analysis in speaker verification." 2018 11th International Symposium on Chinese Spoken Language Processing (ISCSLP). IEEE, 2018. (Year: 2018).*

(Continued)

*Primary Examiner* — Douglas Godbold
(74) *Attorney, Agent, or Firm* — Scully, Scott, Murphy & Presser, P.C.

(57) ABSTRACT

A method and device for fusing voiceprint features. The method includes: obtaining at least two voiceprint features of a voice sample of a target speaker (S3; S4); fusing the at least two voiceprint features on the basis of linear discriminant analysis (S5). The present method introduces a technique employing linear discriminant analysis to fuse various voiceprint features, so as to improve complementarities between the various voiceprint features and distinctions between the fused features, thereby increasing the recogni- (Continued)

tion rate for target speakers and reducing the misrecognition rate for non-target speakers in voiceprint authentication scenarios, and providing personalized and improved user experience.

15 Claims, 3 Drawing Sheets

(51) Int. Cl.
*G06N 3/04* (2023.01)
*G10L 17/02* (2013.01)
*G10L 17/18* (2013.01)
*G10L 25/18* (2013.01)
*G10L 25/24* (2013.01)
*G10L 25/78* (2013.01)

(52) U.S. Cl.
CPC .............. *G10L 17/18* (2013.01); *G10L 25/18* (2013.01); *G10L 25/24* (2013.01); *G10L 25/78* (2013.01)

(56) References Cited

U.S. PATENT DOCUMENTS

| 2018/0254051 A1* | 9/2018 | Church | H04M 3/51 |
| 2020/0135204 A1* | 4/2020 | Robichaud | G10L 17/00 |
| 2020/0194006 A1* | 6/2020 | Grancharov | G06F 17/18 |

OTHER PUBLICATIONS

Snyder, David, et al. "X-vectors: Robust dnn embeddings for speaker recognition." 2018 IEEE international conference on acoustics, speech and signal processing (ICASSP). IEEE, 2018. (Year: 2018).*

Xiang, F., "Speaker Recognition based on Multi-information Fusion", Dissertation for the Master Degree in Engineering, Mar. 2018, pp. 1-65—English Machine Translation (Year: 2018).*

Xiang, F., "Speaker Recognition based on Multi-information Fusion", Dissertation for the Master Degree in Engineering, Mar. 2018, pp. 1-65.

Zhong W. et al., "Fusion of deep shallow features and models for speaker recognition", Acta Acustica, Mar. 2018, pp. 263-272, vol. 43, No. 2.

* cited by examiner

METHOD AND DEVICE FOR FUSING VOICEPRINT FEATURES, VOICE RECOGNITION METHOD AND SYSTEM, AND STORAGE MEDIUM

CROSS-REFERENCE TO RELATED APPLICATIONS

This application is a national stage of PCT International Application No. PCT/CN2019/097294, filed on Jul. 7, 2019, which claims priority to Chinese Patent Application No. 201910101748.3 filed on Jan. 31, 2019. The aforementioned patent applications are is hereby incorporated by reference in its entirety.

TECHNICAL FIELD

Embodiments of the present invention relates to a method and apparatus for fusing voiceprint features, a voice recognition method, a system and a storage medium.

BACKGROUND

Presently, with the popularization of information technology, automatic voice recognition technology is playing an increasingly important role, and its application prospect is wider. Voice signal mainly includes three aspects of information: who said it, which language does it belong to and what is its content. The automatic voice recognition technologies involved are respectively speaker recognition, language recognition and semantic recognition. Speaker recognition technology, also known as voiceprint recognition, is mainly directed to the technology of authenticating the speaker's identity according to the input voice signal. Similar with other recognition technologies, speaker recognition technology is used to recognize input speaker's audio based on certain features so as to recognize the identity of the speaker.

SUMMARY

At least one embodiment of the present disclosure provides a method for fusing voiceprint features comprising: acquiring at least two voiceprint features of a speech sample of a target speaker; and fusing the at least two voiceprint features based on a linear discriminant analysis.

For example, in a method according to at least one embodiment of the present disclosure, acquiring the at least two voiceprint features of the speech sample of the target speaker comprises: acquiring a voice spectrum feature of the speech sample of the target speaker; using the speech spectrum feature as an input, and extracting an i-vector voiceprint feature by using an universal background model and a total variability space matrix; and extracting an x-vector voiceprint feature and a d-vector voiceprint feature by using a deep neural network.

For example, in a method according to at least one embodiment of the present disclosure, fusing the at least two voiceprint features based on a linear discriminant analysis comprises: using the i-vector voiceprint feature, the x-vector voiceprint feature and the d-vector voiceprint feature as samples, and fusing the i-vector voiceprint feature, the x-vector voiceprint feature and the d-vector voiceprint feature based on the linear discriminant analysis.

For example, in a method according to at least one embodiment of the present disclosure, fusing the i-vector voiceprint feature, the x-vector voiceprint feature and the d-vector voiceprint feature based on the linear discriminant analysis comprises: calculating a within-class scatter matrix $S_w$:

$$S_w = \sum_{i=1}^{n} \sum_{x^{(k)} \in D_i} (x^{(k)} - \mu_i)(x^{(k)} - \mu_i)^T$$

where n represents a number of a plurality of class labels; $x^{(k)}$ represents a sample in a subset $D_i$, and $\mu_i$ represents a mean value of a subset $D_i$; calculate a between-class scatter matrix $S_b$:

$$S_b = \sum_{i=1}^{n} p(i)(\mu_i - \mu)(\mu_i - \mu)^T$$

where represents a number of a plurality of class labels; p(i) represents a prior probability of a sample of class i; $\mu_i$ represents a mean value of a subset $D_i$, and $\mu$ represents a mean value of all samples; calculating eigenvalues of a matrix $S_w^{-1}S_b$;
finding largest k eigenvalues of the matrix $S_w^{-1}S_b$ and k eigenvectors $(w_1, w_2, \ldots, w_k)$ corresponding the largest k eigenvalues; and projecting an original sample into a low dimensional space generated based on $(w_1, w_2, \ldots, w_k)$ as a basis vector.

For example, in a method according to at least one embodiment of the present disclosure, extracting the x-vector voiceprint feature and the d-vector voiceprint feature by using the deep neural network comprises: adding a pooling layer to the deep neural network, calculating an average value of the pooling layer, continuing to propagate forward, and extracting an activation value of a subsequent intermediate layer as the x-vector voiceprint feature; and extracting an activation value from a last hidden layer of the deep neural network, and then acquiring the d-vector voiceprint feature by accumulating and calculating an average value of the activation value.

For example, in a method according to at least one embodiment of the present disclosure, the step of acquiring the voice spectrum feature of the voice sample of the target speaker comprises: sampling a voice of the target speaker, selecting an actual voice data in the voice sample of the target speaker by using a voice activity detection algorithm; and extracting a Mel frequency cepstrum coefficient feature as the voice spectrum feature from the actual voice data.

For example, after fusing the at least two voiceprint features based on a linear discriminant analysis, a method according to at least one embodiment of the present disclosure further comprises: conducting channel compensation for the fused at least two voiceprint features, based on a probabilistic linear discriminant analysis, and acquiring a channel-compensated voiceprint feature.

For example, before selecting the actual voice data in the voice sample of the target speaker by using the voice activity detection algorithm, a method according to at least one embodiment of the present disclosure further comprises: acquiring the voice sample of the target speaker. After conducting channel compensation for the fused at least two voiceprint features, based on a probabilistic linear discriminant analysis, and acquiring a channel-compensated voiceprint feature, the method further comprises: outputting the channel compensated voiceprint feature.

At least one embodiment of the present disclosure provides an apparatus for fusing voiceprint features, comprising: an acquisition unit, configured to acquire at least two voiceprint features of a voice sample of a target speaker; and a linear discriminant analysis module, connected to the acquisition unit via signal, and configured to fuse the at least two voiceprint features based on a linear discriminant analysis.

For example, in an apparatus according to at least one embodiment of the present disclosure, the acquisition unit comprises: an universal-background-model and total-variability-space-matrix module, configured to extract an i-vector voiceprint feature, by using a universal background model and a total variability space matrix and using a voice spectrum feature of the voice sample of the target speaker as an input; and a deep neural network module, configured to, by using a voice spectrum feature as an input, using a deep neural network with a pooling layer, calculate an average value of the pooling layer, continue to propagate forward, and extract an activation value of a subsequent intermediate layer as an x-vector feature, extract an activation value from a last hidden layer, and acquire a new d-vector feature by a weighting operation.

For example, in an apparatus according to at least one embodiment of the present disclosure further comprises: a voice activity detection module, configured to process the voice sample of the target speaker, select an actual voice data of the voice sample of the target speaker by using a voice activity detection algorithm; and a voice spectrum feature extraction module, connected to the voice activity detection module and the acquisition unit via signal, configured to extract a Mel frequency cepstrum coefficient feature as the voice spectrum feature from the actual voice data of the voice sample of the target speaker.

For example, in an apparatus according to at least one embodiment of the present disclosure further comprises: a channel compensation module, connected to the deep neural network module via signal, configured to conduct a channel compensation for the fused at least two voiceprint features, based on a probabilistic linear discriminant analysis, and acquire a channel-compensated voiceprint feature.

For example, in an apparatus according to at least one embodiment of the present disclosure further comprises: an audio input module, configured to sample a voice of the target speaker to acquire the voice sample of the target speaker; and a voiceprint feature output module, connected to the channel compensation module via signal and configured to output the channel-compensated voiceprint feature.

At least one embodiment of the present disclosure provides a voice recognition method comprising: acquiring at least two voiceprint features of a voice sample of a target speaker; fusing the at least two voiceprint features based on a linear discriminant analysis; and identifying the identity of the target speaker based on the fused at least two voiceprint features.

At least one embodiment of the present disclosure also provides a system comprising: a processor; and a memory, configured to store instructions that, when executed by the processor, cause the processor to execute anyone of the aforesaid methods.

At least one embodiment of the present disclosure also provides a non-volatile computer storage medium, configured to store instructions that, when executed by a processor, cause the processor to execute anyone of the aforesaid methods.

BRIEF DESCRIPTION OF THE DRAWINGS

In order to clearly illustrate the technical solution of the embodiments of the present disclosure, the drawings of the embodiments will be briefly described in the following. It is obvious that the drawings described below are only related to some embodiments of the present disclosure, and thus are not limitative of the present disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Voiceprint recognition is often readily accepted by users because it does not involve user's privacy. On the other hand, it is the most convenient way to obtain voiceprint. With a portable device, such as a mobile phone, user voiceprint feature information can be obtained and identity authentication can be completed. In a voiceprint recognition system, it is usually necessary to extract voiceprint features that can express the identity of the target speaker. The objective of a method for fusing voiceprint features is to improve the performance of speaker verification (SV) by fusing various voiceprint features. There are two types of voiceprint feature fusion techniques: one is to extract different voiceprint features by using different voiceprint models, and then directly calculate the average value to get the final voiceprint features; the other is to use the similarity score of different voiceprint features to calculate the average value, and fuse different voiceprint features together. However, in the simple way as described above which fuse voiceprint features by calculating the average value of features or similarity scores, the complementarity between features and the discrimination of fused features has not been fully considered.

The present disclosure provides a method and apparatus for fusing voiceprint features, which at least solve the problem that the method for fusing voiceprint features by calculating the mean value of voiceprint features or similarity score is too simple, and the new features obtained are not discriminative enough for speakers.

Figure 1:
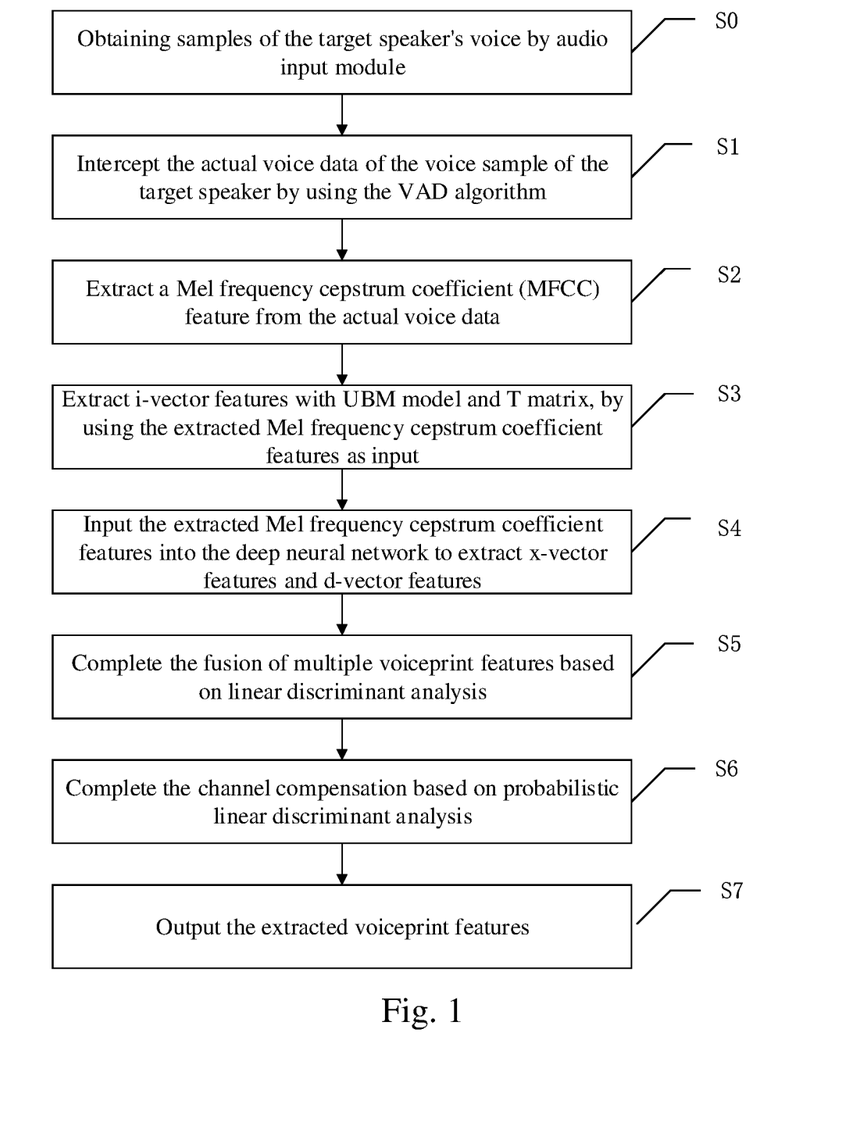
FIG. 1 is a flow chart of a voiceprint feature fusion method according to at least one embodiment of the present disclosure.

FIG. 1 is a flow chart of a method for fusing voiceprint features according to at least one embodiment of the present disclosure. As shown in FIG. 1, the method for fusing voiceprint features according to at least one embodiment of the present disclosure comprises the following steps.

In S1, for acquiring voice sample of the target speaker, the VAD (voice activity detection) algorithm is used to select the actual voice data of the voice sample of the target speaker.

Specifically, the voice sampling of the target speaker is obtained through an audio input module. The audio input module may be a voice collection device such as a microphone.

After acquiring the voice data of the target speaker, VAD algorithm is used to detect the voice boundary. Long silence periods are recognized and eliminated from the voice data, and the actual voice data of the sampled voice data is obtained.

In S2, extracting a Mel frequency cepstrum coefficient (MFCC) feature from the actual voice data.

In the above step, MFCC feature is the cepstrum parameter extracted in Mel scale frequency domain. Mel scale is used to describe the nonlinear characteristics of human ear frequency. In this embodiment, MFCC feature is used to extract the voice spectrum features of target voice data. The MFCC features include 18 dimensional basic cepstrum features and 18 dimensional features after feature compensation for the basic cepstrum features. The feature compensation includes high-order difference, cepstrum mean subtraction, cepstrum variance normalization and relative spectrum (Rasta) filtering. The dimensions of the MFCC features are 36 dimensions.

In S3, using the extracted Mel frequency cepstrum coefficient features as input, i-vector features are extracted with universal-background-model (UBM) and total-variability-space-matrix (T matrix).

In S4, the extracted Mel frequency cepstrum coefficient features are input into the deep neural network to extract x-vector features and d-vector features. It should be understood that the embodiments of the present disclosure are not limited to this. For example, in other embodiments, other voiceprint features of the voice sampling of the target speaker, such as j-vector, can also be used. And, for another example, in other embodiments, two or four or more voiceprint features may also be employed.

Specifically, the step S4 comprises:

In sub step S401, a pooling layer is added to the deep neural networks (DNN). After calculating the average value of the pooling layer, it continues to propagate forward and the activation values of the subsequent intermediate layers are extracted as x-vector features.

In sub step S402, the activation value is extracted from the last hidden layer of the deep neural network (DNN), and then the d-vector feature is obtained through accumulation and averaging operations.

In S5, the i-vector feature extracted in step S3, x-vector feature and d-vector feature extracted in step S4 are taken as samples to complete the fusion of multiple voiceprint features based on linear discriminant analysis (LDA). Linear discriminant analysis can improve the effect of voiceprint authentication. On one hand, LDA is supervised learning, and the prior knowledge of classes can be used in classification and dimension reduction, so as to improve the accuracy of classification. On the other hand, LDA has the characteristics of large between-class dispersion and small within-class dispersion, which can effectively improve the complementarity of various voiceprint features and the distinction of fusion features. Furthermore, it should be understood that in some embodiments, at least a portion of the above mentioned voiceprint features may also be obtained in advance or from the storage medium or network, and there is not limited in the embodiments of the present disclosure.

The process of multi voiceprint feature fusion based on linear discriminant analysis (LDA) includes:

firstly, calculating a within-class-scatter-matrix $S_w$:

$$S_w = \sum_{i=1}^{n} \sum_{x^{(k)} \in D_i} (x^{(k)} - \mu_i)(x^{(k)} - \mu_i)^T$$

where n represents a number of a plurality of class labels; $x^{(k)}$ represents a sample in a subset $D_i$, and $\mu_i$ represents a mean value of a subset $D_i$; and then calculating a between-class-scatter-matrix $S_b$:

$$S_b = \sum_{i=1}^{n} p(i)(\mu_i - \mu)(\mu_i - \mu)^T$$

where represents a number of a plurality of class labels; p(i) represents a prior probability of a sample of class i, and $\mu_i$ represents a mean value of a subset $D_i$, and $\mu$ represents a mean value of all samples; then calculate eigenvalues of a matrix $S_w^{-1}S_b$; and then find the largest k eigenvalues of the matrix $S_w^{-1}S_b$ and k eigenvectors $(w_1, w_2, \ldots, w_k)$ corresponding the largest k eigenvalues; at last, project an original sample into a low dimensional space generated based on $(w_1, w_2, \ldots, w_k)$ as a basis vector.

In S6, the channel compensation is completed based on PLDA (probabilistic linear discriminant analysis), and the voiceprint features are obtained.

The PLDA is a LDA algorithm in the form of probability, which is based on voiceprint features. The voiceprint features include not only speaker information but also channel information. Therefore, with the PLDA algorithm, voiceprint features can be better extracted after channel compensation for voiceprint recognition.

In some embodiments, before the step S1 of selecting the actual voice data of the voice sampling of the target speaker by using the voice activity detection algorithm, the following steps are further included:

In S0, samples of the target speaker's voice can be obtained by the audio input module. In some embodiments, the voice samples of the target speaker can also be obtained in advance or from the storage medium or the network, and the embodiments of the present disclosure are not limited to this.

In some embodiments, after the step S6 of completing channel compensation based on probabilistic linear discriminant analysis and obtaining voiceprint features, the following steps are further included.

In S7, the channel compensated voiceprint feature is output.

In the fusion stage of voiceprint features of the method for fusing voiceprint features of the present disclosure, a variety of voiceprint features are fused by means of linear discriminant analysis, thereby achieving the purpose of improving the complementarity of a variety of voiceprint features and the discrimination of fusion features and ensuring the performance of speaker verification.

According to the method for fusing voiceprint features of at least one embodiment of the present disclosure, a way on the basis of linear discriminant analysis is introduced to fuse multiple voiceprint features, which improves complementarities between the various voiceprint features and distinctions between the fused features, thereby increasing the recognition rate for target speakers and reducing the misrecognition rate for non-target speakers in voiceprint authentication scenarios, and provides improved personalized user experience. The PLDA algorithm is used for channel compensation of voiceprint recognition, by which voiceprint features can be extracted with much better effects.

Figure 2:
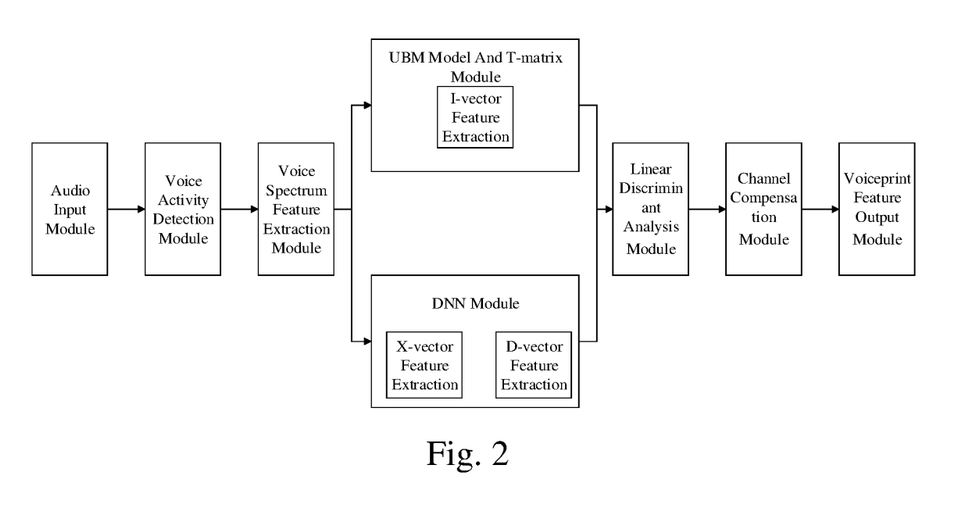
FIG. 2 is a structural diagram of a voiceprint feature fusion apparatus according to at least one embodiment of the present disclosure.

In at least one embodiment of the present disclosure, an apparatus for fusing voiceprint features is provided. FIG. 2 is a structural diagram of an apparatus for fusing voiceprint features according to at least one embodiment of the present disclosure. As shown in FIG. 2, the apparatus for fusing voiceprint features of the present disclosure comprises: a voice activity detection module, a voice spectrum feature extraction module, a universal-background-model and total-variability-space-matrix module, a deep neural network module, a linear discriminant analysis module and a channel compensation module.

The voice activity detection module is used to process the acquired voice sampling data of the target speaker, and VAD (voice activity detection) algorithm is used to select the actual voice data in the voice sampling of the target speaker.

The voice spectrum feature extraction module is connected to the voice activity detection module, is configured to extract a Mel frequency cepstrum coefficient feature from the actual voice data.

The universal-background-model and total-variability-space-matrix module is connected to the voice spectrum feature extraction module, is configured to take the Mel frequency cepstrum coefficient as an input, and to extract an i-vector voiceprint feature, by using a universal background model and a total variability space matrix.

The deep neural network module is connected to the voice spectrum feature extraction module. Generally, the DNN includes an input layer, a plurality of hidden layers and an output layer. The MFCC feature from the voice spectrum feature extraction module is used as an input of the DNN module, a pooling layer is added to the DNN, and an average value of the pooling layer is calculated, continue to propagate forward, and an activation value of a subsequent intermediate layer is extracted as an x-vector feature, an activation value from a last hidden layer is extracted, and a new d-vector feature is acquired by a weighting operation.

The linear discriminant analysis module is connected to the UBM model, the T matrix module and the DNN module respectively. The fusion of multiple voiceprint features is completed by using the linear discriminant analysis (LDA), based on the i-vector features extracted by the UBM model and T matrix module and the x-vector features and d-vector features extracted by the DNN module.

The channel compensation module is connected to the deep neural network module, is configured to conduct a channel compensation based on a probabilistic linear discriminant analysis. In at least one embodiment of the present disclosure, PLDA algorithm is used for channel compensation of voiceprint recognition, by which voiceprint features can be extracted with much better effects.

In some embodiments, one or more of the above voice activity detection module, voice spectrum feature extraction module, UBM model and T matrix module, DNN module, linear discriminant analysis module, and channel compensation module can be implemented by means of general purpose processor, digital signal processor (DSP), application specific integrated circuit (ASIC), field programmable gate array (FPGA) or other programmable logic device, discrete gate or transistor logic, discrete hardware components, or any combination of the above elements designed to perform the functions described herein.

The apparatus for fusing voiceprint features according to at least one embodiment of the present disclosure further comprises: an audio input module, and a voiceprint feature output module.

The audio input module is used to sample the voice of the target speaker. Specifically, the input audio module can be a voice collection device such as a microphone.

The voiceprint feature output module is connected to the channel compensation module for outputting the voiceprint feature after channel compensation.

According to at least one embodiment of the present disclosure, the apparatus for fusing voiceprint features fuses multiple voiceprint features by introducing a method based on linear discriminant analysis, which improves complementarities between the various voiceprint features and distinctions between the fused features, thereby increasing the recognition rate for target speakers and reducing the misrecognition rate for non-target speakers in voiceprint authentication scenarios, and thereby provides improved personalized user experience.

At least one embodiment of the present disclosure also provides a voice recognition method, which includes: the steps of the methods for fusing voiceprint features as described in any of the above embodiments; and identifying the identity of the target speaker based on the fused at least two voiceprint features. The steps of the voiceprint feature fusion method can be referred to the above description with reference to various embodiments, which will not be repeated herein. Conventional methods in the art can be used to perform the steps of identifying the identity of the target speaker based on the fused at least two voiceprint features, and the embodiments of the present disclosure are not limited to this.

So far, the embodiments of the present disclosure have been described in detail in combination with the accompanying drawings. It should be noted that the implementation modes not shown or described in the drawings or the main body of the specification are all known to ordinary technicians in the art and are not described in detail. In addition, the above definition of each element and method is not limited to various specific structures, shapes or methods mentioned in the embodiment, which can be simply changed or replaced by those skilled in the art.

In addition, unless specifically described or steps that must occur in sequence, the sequence of the above steps is not limited to those listed above, and can be changed or rearranged according to the required design. In addition, the above embodiments can be combined with each other or with other embodiments based on the consideration of design and reliability, that is, the technical features in different embodiments can be freely combined to form more embodiments.

The algorithms and displays provided herein are not inherently related to any particular computer, virtual system, or other device. Various general systems can also be used with teaching based on this. From the above description, the structure required to construct such a system is obvious. Furthermore, the present disclosure is not directed at any particular programming language. It should be understood that the contents of the present disclosure described herein may be implemented using various programming languages, and that the description for a particular language is to disclose possible embodiments of the present disclosure.

The present disclosure may be implemented with the aid of hardware including a number of different elements and with the aid of a properly programmed computer. The various component embodiments of the present disclosure may be implemented in hardware, or in software modules running on one or more processors, or in a combination of them. It should be understood by those skilled in the art that microprocessors or digital signal processors (DSP) can be used in practice to realize some or all functions of some or all components of the related devices according to the embodiments of the present disclosure. The present disclosure may also be implemented as a device or device program (e.g., a computer program and a computer program product) for performing part or all of the methods described herein. Such a program implementing the present disclosure may be stored on a computer-readable medium or may be in the form of one or more signals. Such signals can be downloaded from Internet websites, or provided on carrier signals, or in any other form.

Those skilled in the art can understand that the modules in the device in the embodiment can be adaptively changed and set in one or more devices different from the embodiment. The modules or units or components in the embodiment can be combined into one module or unit or component, and in addition, they can be divided into multiple sub modules or sub units or sub components. Except that at least some of such features and/or processes or units are mutually exclusive, all of the features disclosed in this specification (including accompanying claims, abstract and drawings) and all processes or units of any method or apparatus so disclosed may be combined in any way. Unless otherwise expressly stated, each feature disclosed in this specification (including accompanying claims, abstract and drawings) may be replaced by alternative features providing the same, equivalent or similar purpose. Moreover, in the unit claim listing several devices, several of these devices can be embodied by a same hardware.

Figure 3:
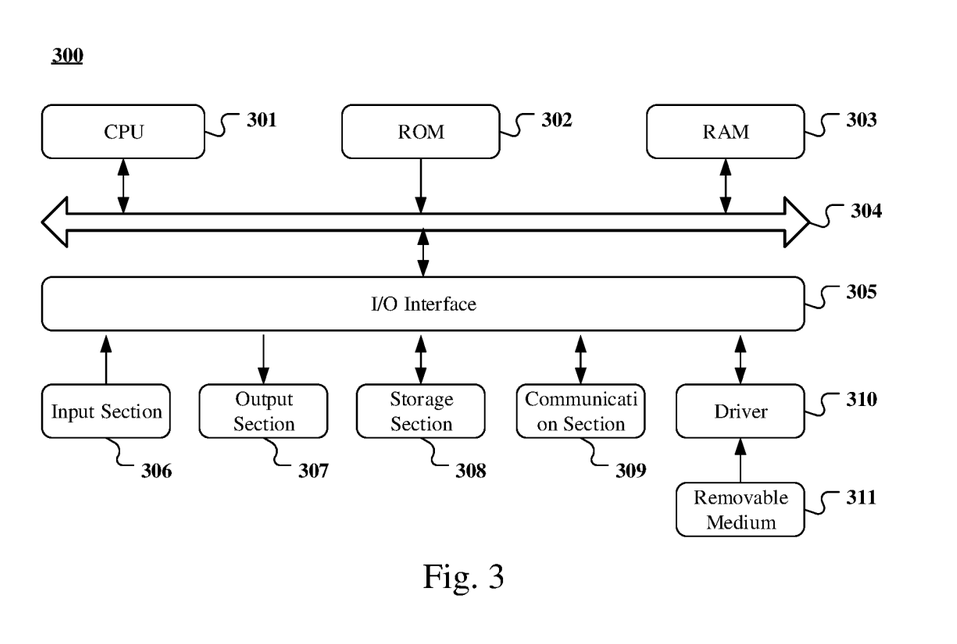
FIG. 3 is a structural diagram of a computer system applicable for implementing a method or apparatus for fusing voiceprint features or a voice recognition method according to at least one embodiment of the present disclosure.

Referring to FIG. 3 as blow, a block diagram of a computer system 300 applicable for implementing a method or apparatus for fusing voiceprint features or a voice recognition method according to at least one embodiment of the present disclosure is shown.

As shown in FIG. 3, the computer system 300 includes a central processing unit (CPU) 301, which may perform various appropriate actions and processes according to a program stored in the read only memory (ROM) 302 or a program loaded into the random access memory (RAM) 303 from the storage section 308. In addition, various programs and data required for the operation of the system 300 can be also stored in the RAM 303. CPU 301, ROM 302 and RAM 303 are connected to each other through bus 304. The input/output (I/O) interface 305 is also connected to the bus 304.

The following components are connected to the I/O interface 305: an input section 306 including a keyboard, a mouse, and the like; an output section 307 including a cathode ray tube (CRT), a liquid crystal display (LCD), and a loudspeaker and the like; a storage section 308 including a hard disk or the like; and a communication section 309 including a network interface card such as a LAN card, a modem, and the like. The communication section 309 performs communication processing via a network such as the Internet. The driver 310 can be also connected to the I/O interface 305 if necessary. A removable medium 311, such as a magnetic disk, an optical disk, a magneto-optical disk, a semiconductor memory, and the like, can be mounted on the drive 310 as needed, so that a computer program read out from it is installed on the storage section 308 as needed.

In particular, according to an embodiment of the present disclosure, the process described above with reference to FIG. 1 may be implemented as a computer software program. For example, embodiments of the present disclosure include a computer program product that includes a computer program tangibly contained on a machine-readable medium that includes program code for executing the method of FIG. 1. In such an embodiment, the computer program may be downloaded and installed from the network through the communication section 309, and/or installed from the removable medium 311.

The flow charts and block diagrams in the drawings illustrate the architecture, functions, and operations of possible implementations of systems, methods, and computer program products in accordance with various embodiments of the present disclosure. In this regard, each block in a flowchart or block diagram may represent a module, program segment, or part of code that contains one or more executable instructions for implementing a specified logical function. It should also be noted that in some alternative implementations, the functions indicated in the block may also occur in a sequence different from that indicated in the drawings. For example, two consecutive blocks can actually be executed in parallel, sometimes in reverse order, depending on the function involved. It should also be noted that each block in the block diagram and/or flow chart, and the combination of blocks in the block diagram and/or flow chart, can be implemented by a dedicated hardware based system that performs specified functions or operations, or by a combination of dedicated hardware and computer instructions.

The unit or module described in the embodiment of the present disclosure can be realized by software or by hardware. The described unit or module can also be set in the processor, for example, it can be described as a processor including an acquisition unit and a linear discriminant analysis module. In some cases, the names of these units or modules do not constitute a restriction on the unit or module itself.

The present disclosure also provides a computer-readable storage medium, which can be a computer-readable storage medium contained in the device in the above embodiment; or a computer-readable storage medium that exists alone and is not assembled into the device. A computer-readable storage medium stores one or more programs used by one or more processors to perform a method for fusing voiceprint features or a voice recognition method described in the present disclosure.

Similarly, it should be understood that in order to simplify the present disclosure and help understand one or more of the various aspects of the disclosure, in the above description of exemplary embodiments of the present disclosure, the various features of the present disclosure are sometimes grouped together into a single embodiment, figure, or description thereof. However, the disclosed method should not be interpreted as reflecting the intention that the claimed features of the present disclosure are more than those explicitly recorded in each claim. More specifically, as reflected in the following claims, the disclosed aspect lies in less than all the features of the previously disclosed single embodiment. Therefore, the claims that follow the specific embodiment are hereby explicitly incorporated into the specific embodiment, in which each claim itself is a separate embodiment of the present disclosure.

The above is only an exemplary embodiment of the present disclosure, and is not used to limit the scope of protection of the present disclosure which is determined by the appended claims.

What is claimed is:

1. A method for fusing voiceprint features, comprising:
acquiring at least two voiceprint features of a voice sample of a target speaker; and
fusing the at least two voiceprint features based on a linear discriminant analysis,
wherein acquiring the at least two voiceprint features of the voice sample of the target speaker comprises:
acquiring a voice spectrum feature of the voice sample of the target speaker;
extracting an i-vector voiceprint feature by using a universal background model and a total variability space matrix and using the voice spectrum feature as an input; and
extracting an x-vector voiceprint feature and a d-vector voiceprint feature by using a deep neural network, and
wherein extracting the x-vector voiceprint feature and the d-vector voiceprint feature by using the deep neural network, comprises:
adding a pooling layer to the deep neural network, calculating an average value of the pooling layer, continuing to propagate forward, and extracting an activation value of a subsequent intermediate layer as the x-vector voiceprint feature; and
extracting an activation value from a last hidden layer of the deep neural network, and then acquiring the d-vector voiceprint feature by accumulating and calculating an average value of the activation value.

2. The method according to claim 1, wherein fusing the at least two voiceprint features based on a linear discriminant analysis comprises:
using the i-vector voiceprint feature, the x-vector voiceprint feature and the d-vector voiceprint feature as samples, and fusing the i-vector voiceprint feature, the x-vector voiceprint feature and the d-vector voiceprint feature based on the linear discriminant analysis.

3. The method according to claim 2, wherein fusing the i-vector voiceprint feature, the x-vector voiceprint feature and the d-vector voiceprint feature based on the linear discriminant analysis, comprises:
calculating a within-class scatter matrix $S_w$:

$$S_w = \sum_{i=1}^{n} \sum_{x^{(k)} \in D_i} (x^{(k)} - \mu_i)(x^{(k)} - \mu_i)^T$$

where n represents a number of a plurality of class labels, $x^{(k)}$ represents a sample in a subset $D_i$, and $\mu_i$ represents a mean value of a subset $D_i$;
calculating an inter-class scatter matrix $S_b$:

$$S_b = \sum_{i=1}^{n} p(i)(\mu_i - \mu)(\mu_i - \mu)^T$$

where n represents a number of a plurality of class labels, $P^{(i)}$ represents a prior probability of a sample of class i, $\mu_i$ represents a mean value of a subset $D_i$, and $\mu$ represents a mean value of all samples;
calculating eigenvalues of a matrix $S_w^{-1} S_b$;
finding largest k eigenvalues of the matrix $S_w^{-1} S_b$ and k eigenvectors $(w_1, w_2, \ldots, w_k)$ corresponding the largest k eigenvalues; and
projecting an original sample into a low dimensional space generated based on $(w_1, w_2, \ldots, w_k)$ as a basis vector.

4. The method according to claim 3, after fusing the at least two voiceprint features based on a linear discriminant analysis, further comprising:
conducting channel compensation for the fused at least two voiceprint, based on a probabilistic linear discriminant analysis, and acquiring a channel-compensated voiceprint feature.

5. The method according to claim 1, wherein the step of acquiring the voice spectrum feature of the voice sample of the target speaker comprises:
sampling a voice of the target speaker, and selecting an actual voice data in the voice sample of the target speaker by using a voice activity detection algorithm; and
extracting a Mel frequency cepstrum coefficient feature as the voice spectrum feature from the actual voice data.

6. The method according to claim 5, before selecting the actual voice data in the voice sample of the target speaker by using a voice activity detection algorithm, further comprising:
acquiring the voice sample of the target speaker, and
after conducting channel compensation for the fused at least two voiceprint features, based on a probabilistic linear discriminant analysis, and acquiring a channel-compensated voiceprint feature, the method further comprising:
outputting the channel-compensated voiceprint feature.

7. An apparatus for fusing voiceprint features, comprising:
an acquisition unit, configured to acquire at least two voiceprint features of a voice sample of a target speaker; and
a linear discriminant analysis module, connected to the acquisition unit via signal and configured to fuse the at least two voiceprint features based on a linear discriminant analysis,
wherein the acquisition unit comprises:
a universal-background-model and total-variability-space-matrix module, configured to extract an i-vector voiceprint feature, by using a universal background model and a total variability space matrix and using a voice spectrum feature of the voice sample of the target speaker as an input; and
a deep neural network module, configured to, by using a voice spectrum feature as an input, using a deep neural network with a pooling layer, calculate an average value of the pooling layer, continue to propagate forward, extract an activation value of a subsequent intermediate layer as an x-vector feature, extract an activation value from a last hidden layer, and acquire a new d-vector feature by a weighting operation.

8. The apparatus according to claim 7, further comprising:
a voice activity detection module, configured to process the voice sample of the target speaker and select an actual voice data of the voice sample of the target speaker by using a voice activity detection algorithm; and
a voice spectrum feature extraction module, connected to the voice activity detection module and the acquisition unit via signal, configured to extract a Mel frequency cepstrum coefficient feature as the voice spectrum feature from the actual voice data of the voice sample of the target speaker.

9. The apparatus according to claim 7, further comprising:
a channel compensation module, connected to the deep neural network module via signal, configured to conduct a channel compensation for the fused at least two voiceprint features, based on a probabilistic linear discriminant analysis, and acquire a channel-compensated voiceprint feature.

10. The apparatus according to claim 9, further comprising:
an audio input module, configured to sample a voice of the target speaker to acquire the voice sample of the target speaker; and
a voiceprint feature output module, connected to the channel compensation module via signal and configured to output the channel-compensated voiceprint feature.

11. A voice recognition method, comprising:
acquiring at least two voiceprint features of a voice sample of a target speaker;
fusing the at least two voiceprint features based on a linear discriminant analysis; and
identifying the identity of the target speaker based on the fused at least two voiceprint features,
wherein acquiring at least two voiceprint features of the voice sample of the target speaker comprises:
acquiring a voice spectrum feature of the voice sample of the target speaker;
extracting an i-vector voiceprint feature, by using a universal background model and a total variability space matrix and using the voice spectrum feature as an input; and
extracting an x-vector voiceprint feature and a d-vector voiceprint feature by using a deep neural network, and
wherein extracting the x-vector voiceprint feature and the d-vector voiceprint feature by using the deep neural network, comprises:
adding a pooling layer to the deep neural network, calculating an average value of the pooling layer, continuing to propagate forward, and extracting an activation value of a subsequent intermediate layer as the x-vector voiceprint feature; and
extracting an activation value from a last hidden layer of the deep neural network, and then acquiring the d-vector voiceprint feature by accumulating and calculating an average value of the activation value.

12. The method according to claim 11, wherein fusing the at least two voiceprint features based on a linear discriminant analysis comprises:
fusing the i-vector voiceprint feature, the x-vector voiceprint feature and the d-vector voiceprint feature based on the linear discriminant analysis, using the i-vector voiceprint feature, the x-vector voiceprint feature and the d-vector voiceprint feature as samples.

13. The method according to claim 12, wherein fusing the i-vector voiceprint feature, the x-vector voiceprint feature and the d-vector voiceprint feature based on the linear discriminant analysis comprises:
calculating an intra-class-scatter-matrix $S_w$:

$$S_w = \sum_{i=1}^{n} \sum_{x^{(k)} \in D_i} (x^{(k)} - \mu_i)(x^{(k)} - \mu_i)^T$$

where n represents a number of a plurality of class labels, $x^{(k)}$ represents a sample in a subset $D_i$, and $\mu_i$ represents a mean value of a subset $D_i$;
calculating an inter-class-scatter-matrix $S_b$:

$$S_b = \sum_{i=1}^{n} p(i)(\mu_i - \mu)(\mu_i - \mu)^T$$

where n represents a number of a plurality of class labels, p(i) represents a prior probability of a sample of class i, $\mu_i$ represents a mean value of a subset $D_i$, and $\mu$ represents a mean value of all samples;
calculating eigenvalues of a matrix $S_w^{-1} S_b$;
finding largest k eigenvalues of the matrix $S_w^{-1} S_b$ and k eigenvectors ($w_1, w_2, \ldots, w_k$) corresponding the largest k eigenvalues; and
projecting an original sample into a low dimensional space generated based on ($w_1, w_2, \ldots, w_k$) as a basis vector.

14. A system comprising:
a processor; and
a memory, configured to store instructions that, when executed by the processor, cause the processor to execute the method according to claim 1.

15. A non-transitory computer-readable storage medium, configured to store instructions that, when executed by a computer, cause the computer to execute the method according to claim 1.

* * * * *